United States Patent [19]
Kuboshima

[11] 4,006,488
[45] Feb. 1, 1977

[54] BELLOWS FOR USE IN A FOLDABLE CAMERA

[75] Inventor: Makoto Kuboshima, Minami-ashigara, Japan

[73] Assignee: Fuji Photo Film Co., Ltd., Minami-ashigara, Japan

[22] Filed: Sept. 4, 1975

[21] Appl. No.: 610,349

[30] Foreign Application Priority Data

Sept. 5, 1974 Japan .................... 49-102625

[52] U.S. Cl. ................................. 354/187
[51] Int. Cl.² ................................ G03B 17/04
[58] Field of Search ................. 354/187–194

[56] References Cited

UNITED STATES PATENTS

| | | | |
|---|---|---|---|
| 1,184,110 | 5/1916 | Linder | 354/193 |
| 1,298,312 | 3/1919 | Earle | 354/187 X |
| 1,851,095 | 3/1932 | Gosselin | 354/193 |
| 3,375,767 | 4/1968 | Hanlon | 354/187 |
| 3,706,267 | 12/1972 | Harvey | 354/187 |

FOREIGN PATENTS OR APPLICATIONS

| | | | |
|---|---|---|---|
| 505,632 | 10/1919 | France | 354/187 |

Primary Examiner—John Gonzales
Attorney, Agent, or Firm—Sughrue, Rothwell, Mion, Zinn & Macpeak

[57] ABSTRACT

There is disclosed a bellows for use in a foldable camera provided between the main body and lens mount of the camera with inward and outward folding lines including a couple of lines to raise and to bow the lens mount against the main body in the folded configuration, thereby facilitating the accommodation of the lens mount within the camera room provided in front of the main body.

10 Claims, 29 Drawing Figures

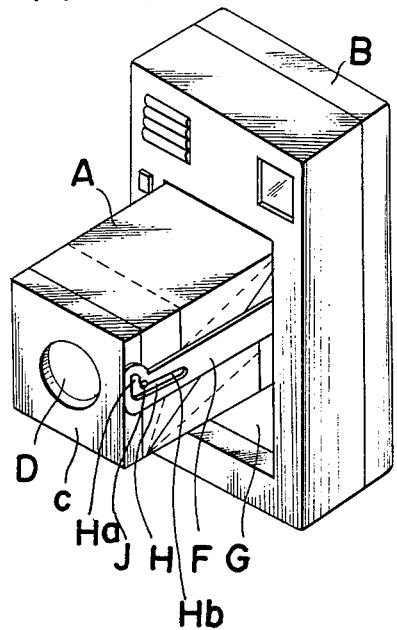
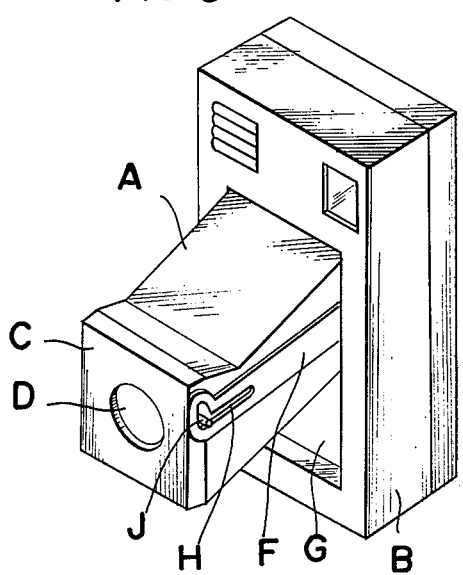
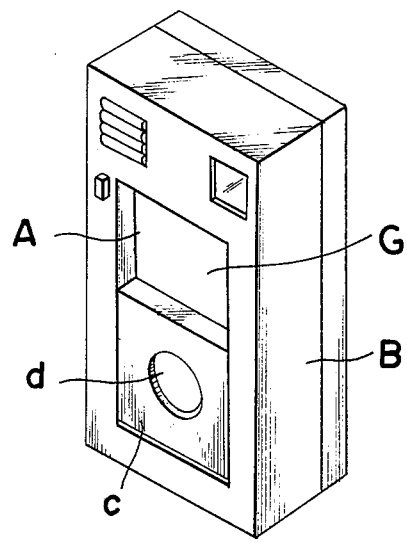

BELLOWS FOR USE IN A FOLDABLE CAMERA

BACKGROUND OF THE INVENTION

1. FIELD OF THE INVENTION

The present invention relates to a foldable camera with a bellows, and more particularly to a flexible bellows of the camera capable of expanding when taking a photograph and of folding when carrying the camera.

2. DESCRIPTION OF THE PRIOR ART

A folding camera of the type to which the present invention is directed comprises a box-like main body provided with a hollow room in front of an exposure frame for exposing a photograph film accommodated thereon, a lens mount supporting a lens at the center thereof, and a foldable bellows extending between the main body and lens mount and permitting itself to be moved between an expanded position at which the lens is located in operative image-forming relation to the photograph film and a folded position at which the lens mount is received as one unit within the room of the main body. In previously known cameras of this type, a bellows is formed of a cylindrical, polygonal prism providing with many pleats thereon vertically to the light axis of the bellows, so that the lens mount moves with the bellows along the light axis of the bellows toward the main body and attaches to the main body through the bellows protruding from the main body, thereby increasing the thickness of the camera. In addition, to maintain the expanded position there is provided a means of one or more linkage members adapted to lock the bellows in the expanded configuration to locate the lens mount in that position, whereby the appearance and construction of the camera is complicated and trouble-some.

The essential objects of the present invention are to enhance the appearance and to simplify the construction and operation of a folding camera provided with a bellows supporting the lens mount, and also to improve the accuracy and positiveness with which the lens of the lens mount is located not only in operative image-focusing relation to the camera film, but also in accommodated receiving relation to the main body.

A further object of the present invention is to provide a bellows for use in a foldable camera which can fold in order to shift the lens mount parallel to or at a certain inclination to the light axis of the camera, or to revolve the lens mount in a certain angle against the main body to receive the same within a hollow room provided in front of the exposure frame, thereby facilitating the accommodation of the lens mount within the camera body.

A still further object of the present invention is to provide a bellows for use in a foldable camera which is foldable by means of inward and outward folding lines provided thereon to form at least one triangle including a diagonal line, so that the bellows maintains itself in the expanded position due to the reenforcement of the diagonal line.

Briefly, these and other related objects of the present invention are accomplished by providing such a bellows for use in a foldable camera which is made of light proof material. Further, the bellows takes the shape of a hollow tube of rectangular cross section and of a hexahedral prism in the expanded configuration with top, right-side, left-side and bottom planes and openings at the both ends thereof symmetrical with respect to the light axis of the bellows, being affixed between the exposure frame of a camera body and the lens mount of a lens at said openings, and comprises in combination of first outward folding lines provided along all edges of each of said planes to fold each of said planes toward the exposure frame or lens mount, a second inward folding line provided on the top plane parallel with and adjacent to the edge affixed to the lens mount to fold the top plane in two so as to raise the lens mount against the exposure frame, a third inward folding line provided on the bottom plane parallel with and adjacent to the edge affixed to the exposure frame to fold the bottom plane in two so as to bow the lens mount against the exposure frame, a pair of fourth outward folding lines each provided diagonally from the upper corner of each of the side planes at the side of the exposure frame to the bottom edge of the same plane symmetrical with each other so as to form at least one triangle, and a set of fifth inward and outward folding lines provided on both the side planes to fold the side planes in association with the folding of said bellows material at first to fourth lines so as to pile up the material about the first and fourth lines between the exposure frame and lens mount.

These and other objects and features of the present invention will become apparent from the following description taken in conjunction with preferred embodiments thereof with reference to the accompanying drawings.

BRIEF DESCRIPTION OF THE DRAWINGS

It is to be noted that, for facilitation of a better understanding of the present invention, like parts are designated by like reference numerals throughout the accompanying drawings.

DESCRIPTION OF PREFERRED EMBODIMENTS

Figure 1:
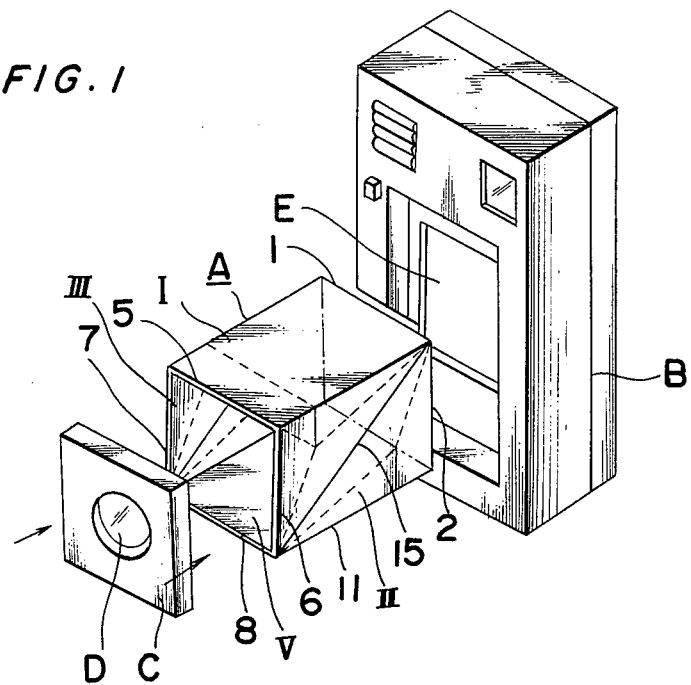
FIG. 1 is a perspective view showing components of a camera, that is, a main camera body, bellows and lens mount in accordance with the first embodiment of the present invention, FIG. 2 (a) and FIG. 2 (b) are perspective views of the bellows of FIG. 1, showing partly and completely folded configurations thereof, respectively.
Figure 2A:
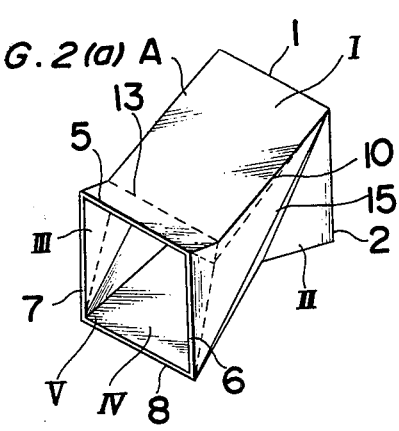
Figure 2B:
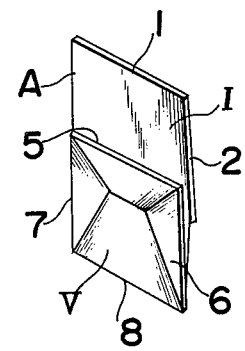

Referring now to the first embodiment of the present invention as shown in FIGS. 1 to 6, there is provided a bellows A of lightproof material between a camera main body B and a lens mount C, which is so constructed as to make it expandable and foldable along a set of predetermined folding lines 1 to 32 in such a manner that the lens mount C is held, in the expanded configuration of the bellows A, to keep a constant focal length against the camera main body B for guiding rays of light entering from a lens D of the lens mount C onto a photograph film to be exposed through an exposure frame E of the camera main body B, while, in the folded configuration of the bellows A, the lens mount C approaches or almost contacts, through the bellows A flattened out and folded with the set of folding lines 1 to 32, the camera main body B to make it compact as one unit with the camera main body B.

The bellows A is formed in the expanded configuration of a tubular rectangular prism with four rectangular planes I to IV, i.e., top I$a$ to $d$, right-side II$c$ to $f$, left-side III$abgh$ and bottom planes IV$e$ to $h$ and openings V$aceg$ and VI$bdfh$ provided at respective ends thereof. Each edge 1 to 4 of the rear opening VI is substantially affixed to the corresponding edge of the exposure frame E provided in front of the main camera body B in a known manner, and each edge 5 to 8 of the front opening V is also substantially affixed to each edge of the square back side of the lens mount C having the lens D arranged vertically to a center axis of the four rectangular planes I to IV extending between the openings V and VI. In other words, all of the edges 1 to 8 of the openings V and VI, i.e., both the outsides of the rectangular planes I to IV are respectively secured in a light-proof construction to the counterpart edges of the exposure frame E and lens mount C so as to make a rectangular prism formation in the expanded configuration of the bellows A.

It is to be noted that each edge 1 to 12 of the rectangular planes I to IV is secured to the counterpart edge of the other rectangular planes, the exposure frame E or the lens mount C by means of a hinge member or flexible member made of flexible materials such as paper, fiber, leather and the like to form a straight outward folding line thereon, so that the bellows A is foldable along all of the edges 1 to 12 of the rectangular planes I to IV, each angle between the faces of the rectangular planes I to IV, the front plane of the exposure frame E and the rear plane of the lens mount C can be changed from a right angle in the expanded configuration of the bellows A to near zero angle in the folded configuration of the bellows A. Also, the bellows A may be made itself of flexible materials and is provided with the set of folding lines 1 to 32 along the edges and within the faces of the rectangular planes I to IV, so that, though, in the expanded configuration of the bellows A, the exposure frame E and lens mount C are arranged at an interval of the length of the bellows A in a position vertical to and being in line with the center axis is the four rectangular planes I to IV, the the folded configuration of the bellows A, the bellows A is sandwiched between the exposure frame E and lens mount C, of which centers are positioned in parallel to and in discord with each other, upon piling up the bellows material defining the four rectangular planes I to IV with the lens mount C onto the exposure frame E according to the set of folding lines 1 to 32 as described hereinbelow.

Figure 3:
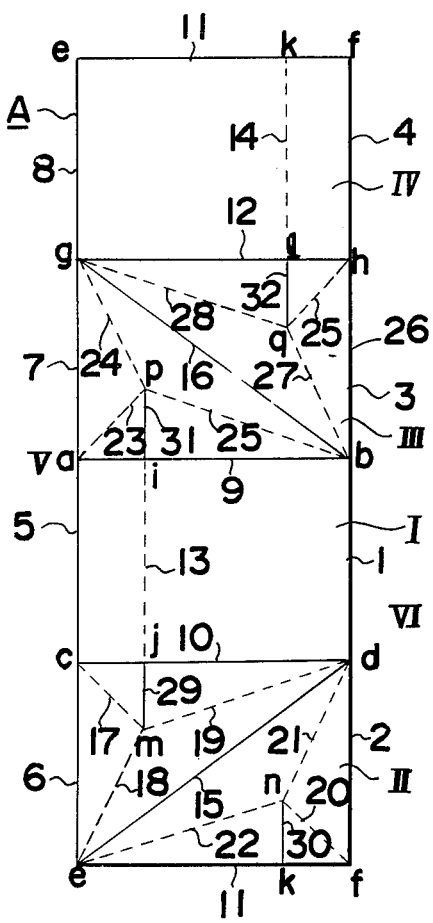
FIG. 3 is a developing view of the bellows of FIG. 1, FIGS. 4 to 6 are perspective views of the camera assembled the components of FIG. 1, showing expanded, partly-folded and completely-folded configurations of the bellows, respectively.

As shown with the development view of the bellows A in FIG. 3, all of the folding lines 1 to 32 provided on the bellows A are substantially straight and classified into two kinds, that is, outward folding lines shown with real lines, by which the divided two parts can turn outwardly relative to the eptical axis against each other to make the angle between the front planes of the parts wide, and inward folding lines shown with dotted lines, by which the divided two parts can turn inwardly relative to the optical axis against each other to make the angle between the front planes of the parts narrow.

On the top and bottom planes I and IV there are respectively provided inward folding lines 13, 14 in parallel to and at a certain distance from the front and rear edges 5, 4 of the top and bottom planes I and IV, both ends 13$i$, 13$j$, 14$k$, 14$l$ of the folding lines 13 and 14 meeting perpendicularly the side edges 9, 10, 11, 12 of the top and bottom planes I and IV, which are border lines forming outward folding lines 9 to 12 in connection with the other side planes II and III, and said distance being determined in connection with folding lines 15 to 32 on both the side planes II and III. By the provision of the inward folding lines 13 and 14 the top and bottom planes I and IV are respectively divided into two rectangular parts I$acij$, I$bdij$, and IV$egkl$, IV$fhkl$ both being capable of folding or piling together on themselves upon the exposure frame E in the folding configuration of the bellows A.

On the right and left side planes II and III there are respectively provided outward folding lines 15 and 16 coincident with diagonals of the side planes II and III drawing from the upper corners II$d$, III$b$ of the side planes II and III at the rear sides to the lower corners II$e$, III$g$ of the side planes II and III at the front sides to divide the side planes II and III into a couple of right triangles II$cde$, II$def$ and III$abg$, III$bgh$, and a set of folding lines 17 to 32 comprising a pair of three inward folding lines 17 to 28 which connect the vertices II$c$, II$d$, II$e$, II$f$, III$a$, III$b$, III$g$, III$h$ of the triangles II$cde$, II$def$, III$abg$, III$bgh$ and the centroids II$m$, II$n$, III$p$, III$q$ of inscribed circles within the same triangles II$cde$, II$def$, III$abg$, III$bgh$, and a pair of outward folding lines 29 to 32 which drop perpendicularly from the centroids II$m$, II$n$, III$p$, III$q$ of the triangles to the side edges 9 to 12 of the side planes II and III to connect with the inward folding lines 13 and 14 of the top and bottom planes I and IV, each of said three lines 17 to 28 of the triangles II$cde$, II$def$, III$abg$, III$bgh$ bisecting the corresponding vertex angle of the triangles between two sides 6–10, 6–18, 10–15, 2–11, 2–15, 11–15, 7–9, 7–16, 9–16, 3–12, 3–16, 12–16 of the triangles, and the lines 17 to 32 provided on both the right and left side planes II and III being symmetrical with each other on the bases of the top and bottom planes I and IV.

In the folded configuration of the bellows A, the diagonal lines 15, 16 of the side planes II and III are folded in piles over the outsides 2, 3, 6, 7 of the same planes II and III putting therebetween the border lines 9 to 12 of the four planes I to IV, which are folded inwardly into two sections 9ai, 9ib, 10cj, 10jd, 11ek, 11kf, 12gl, 12lh with a couple of right lines 13, 14 and 29 to 32 to pile with each other, by folding inwardly the bisector lines 17 to 28 of the triangles IIcde, IIdef, IIIabg, IIIbgh, so that the lens mount C approaches near to and is piled up over the exposure frame E through the folded bellows A, the lens mount C being bowed along the rectangular line 14 of the bottom plane IV and raised along the rectangular line 13 of the upper plane I to the exposure frame E so as to move downwardly in parallel with the exposure frame E.

Accordingly, in the expanded configuration of the bellows A, all of the folding lines 13 to 32 on each planes I to IV are always stretched so as to become flat to the planes I to IV, thereby the bellows A maintains a constant distance between the camera main body B and the lens D and forms a light-proof chamber of regular prism shape for the lens mount C, the two diagonal lines 15, 16 of the side planes II and III reinforcing the expanded configuration of the bellows A. On the contrary, in the folded configuration of the bellows A, all the outward folding lines 1 to 12, 15, 16, 29, 31 are forcibly folded outwardly to overlap together on the outside of the planes I to IV and all the inward folding lines 13, 14, 17 to 28 are simultaneously folded inwardly to be hidden within the top and bottom planes I and IV, whereby the bellows A is collapsed like a rectangular sheet with five pleats 11kf, 11ek, 15, 10dj, 10jc and 12eh, 12eg, 16, 9bi, 9ai of the outward folding lines being sandwiched between the exposure frame E and lens mount C.

It is to be noted that the lens mount C is positioned to put the lens D on the axis of the exposure frame E in the expanded configuration of the bellows A, but, by folding of the bellows A, the lens mount C is automatically shifted to another position lower than the axis of the exposure frame E or optical axis of the camera at a distance of the length of the diagonal lines 15, 16 of the side planes II and III minus the height of the side planes II and III. Also, since the thickness of the pleats of the bellows A is substantially comparable to that of materials of the bellows A, by folding of the bellows A, the lens mount C may approach the exposure frame E to a distance therefrom of about 10 times the thickness of the bellows A, material so that the thinner the material of the bellows A, the smaller the distance between the lens mount C and the exposure frame E.

As mentioned above, the bellows A is assembled in one unit with the camera main body B and the lens mount C, as shown in FIGS. 4 to 6, in association with a lever F provided between the camera main body B and lens mount C as a reenforcement member to maintain the expanded configuration of the bellows A, and a room G of the camera main body B for receiving the bellows A and the lens mount C in the folded configuration of the bellows A. The room G is provided as a hollow within the camera main body B in front of the exposure frame E having a shape of rectangular prism with a width slight larger than that of the lens mount C, a depth slight larger than thickness of the lens mount C plus thickness of the folded bellows A and a height slight larger than the length of the diagonal line 15, 16 of the side planes II and III, to receive almost completely the lens mount C together with the folded bellows A therein, thereby rendering the camera compact in the folded configuration of the bellows A. Along the right side plane II of the bellows A is provided the lever F, one end thereof is pivotally secured to the camera main body B and the other end thereof is provided a L-shaped groove H comprising a cut-out portion Ha and a eliptical portion Hb into which a pin J provided on the right side of the lens mount C is slidably inserted, so that, when the pin J hangs in the cut-out portion Ha of the groove H, the lever F prevents the expanded bellows A from colapsing and, when the pin J is slid into the eliptical portion Hb, the lever permits the folding of the bellows A. Another lever may be provided along the left side of the bellows A in the same manner as the above mentioned lever at the right side of the bellows A.

Figure 7:
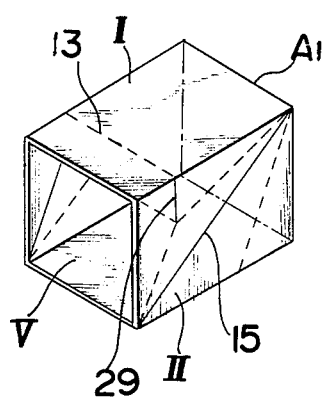
FIGS. 7 and 8 are perspective views of a bellows in a modification of the first embodiment, showing upper and bottom planes thereof, respectively.
Figure 8:
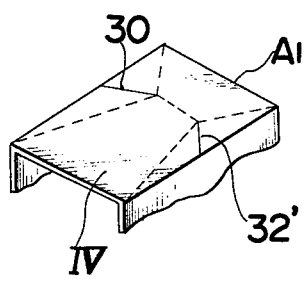
Figure 9:
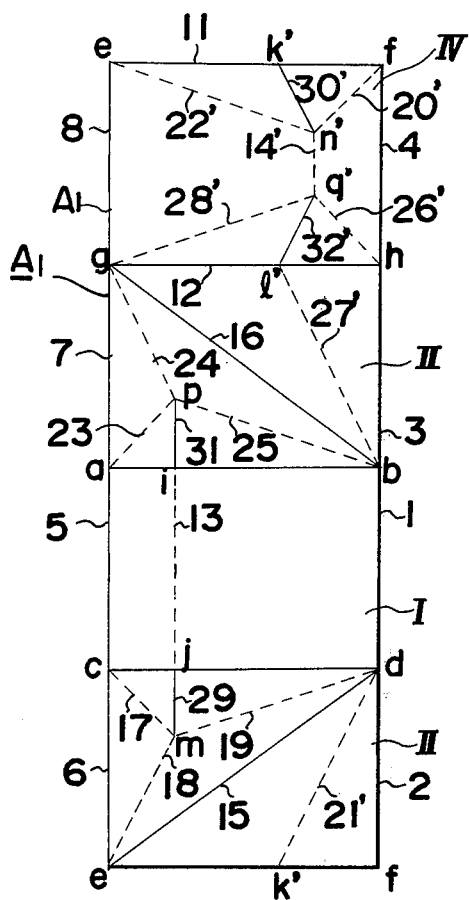
FIG. 9 is a developing view of the bellows of FIG. 7.
Figure 10:
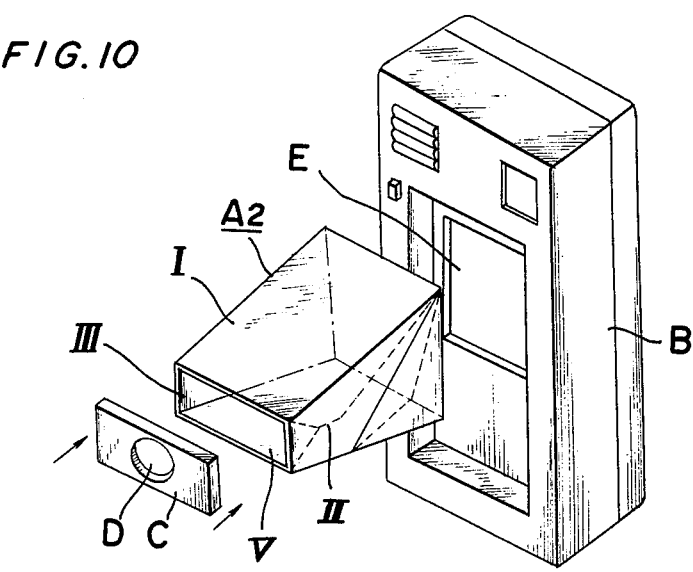
FIG. 10 is a perspective view similar to FIG. 1, showing the second embodiment of the present invention, FIGS. 11 (a) and FIG. 11 (b) are perspective views of the bellows of FIG. 10, showing partly and completely folded configurations thereof, respectively, FIG. 11 (c) is a side view of the bellows of FIG. 10, showing the completely folded configuration thereof.

As one modification of the first embodiment, some folding lines 20, 22, 26, 28, 30, 32 within the triangles IIdef, IIIbgh of the side planes II and III may, as shown in FIGS. 7 to 9, be shifted into the neighboring plane of the bellows A1, that is, the bottom plane IV in such a manner that two pairs of the bisector inward folding lines 20', 22', 26', 28' forming triangles IIefn, IIIhgq with the border lines 11, 12 turn over around said border lines 11, 12 to shift into the next bottom plane IV, the vertices n', q' of said triangles IIefn, IIIhgq being placed on and cut out the rectangular line 14' of the bottom plane IV, while the other bisector inward folding lines 21', 27' extend to and meet with said border lines 11, 12 at k', l' which the points k', l' are connected to said vertices n', q' of said triangles IIefn, IIIhgq to form new outward folding lines 30', 32' substituting for the connecting outward lines 30, 32 of the side planes II and III.

In this modification, the border lines 11, 12 of the bottom plane IV are folded to pile up between the folded bottom plane IV which is folded in two about the trapezoid inward folding line 14', through the bellows material is folded about the broder lines 11, 12 of the bottom plane IV in the original first embodiment to pile up the material on the folded diagonal lines 15, 16 of the side planes II and III. Also, some folding lines 17, 19, 23, 25, 29, 31 within another triangles IIcde, IIIabg of the side planes II and III may be shifted within the upper plane I in the same manner as the above folding lines 20', 22', 26', 28', 30', 32' in the bottom plane IV.

Referring now to the second embodiment of the present invention as shown in FIGS. 10 to 15, the bellows A2 is formed in the expanded configuration, in place of the cylindrical rectangular prism of the first embodiment, of a cylindrical frustrum of a quadrangular pyramid with top and bottom rectangular planes I and IV, right and left side trapezoid planes II and III, which are symmetrical with respect to the center right lines of the side planes II and III, and front and rear openings V and VI at the both ends, which are respectively affixed to the lens mount C and the exposure frame E of the main camera body. In the planes I to IV of the bellows A2 there are provided the same outward and inward folding lines 1 to 32 relations to the optical axis of the camera each coresponding to that of the first embodiment, in addition to a set of new folding lines 33 to 45 for the mediation of the bisector inward lines 17 to 19, 23 to 25 which are connected with each other on the center right lines 33, 34 of the side planes II and III.

In this embodiment, the diagonal outward folding lines 15, 16 connect the upper-left side corners b, d of the side planes II and III and any middle points $jl$, $sl$ on the bottom lines 11, 12 of the side planes II and III to form triangles II$dfjl$, III$bhsl$, and each of the bisector inward folding lines 17 to 28 bisects the corresponding vertex angles between the side lines 2, 3, 6, 7, 9 to 12 of the side planes II and III and the diagonal lines 15, 16, all the bisector lines 20 to 22, 26 to 28 lying within the triangles II$dfjl$, III$bhsl$ being met with each other at the centroids $n$, $q$ of the triangles and the remaining bisector lines 17 to 19, 23 to 25 lying without the triangles being met with each other by the mediator lines 33, 34 lying on the center right lines of the side planes II and III between the meeting points $m1$ and $m2$, $p1$ and $p2$.

In addition, there are provided three connecting outward folding lines 36, 37, 39, 40, 44, 45 perpendicular from the meeting points $m1$, $m2$, $p1$, $p2$ of the bisector lines 17 to 19, 23 to 25 and mediator lines 33, 34 to the top and bottom lines 9 to 12 of the side planes II and III and each 36, 37, 39, 40, 44, 45 connected to rectangular inward folding lines 13, 42, 43 lying within the upper and bottom planes I and IV, the folding lines 13 and 43 being positioned at a distance almost equal to a half of the length of outside edges 6, 7 of the side planes II and III from the outside edges 6, 7 of the side planes II and III, and a pair of associated folding lines 35, 38, 41 comprising an outward folding line 41 connecting between the middle points $j1$, $s1$ of the diagonal lines 15, 16 and inward folding lines 35, 38 connecting the middle points $j1$, $s1$ of the diagonal lines 15, 16 and the meeting points $m1$, $p1$ of the mediator lines 33, 34, all of the folding lines 13, 14, 41 to 43 lying within the top and bottom planes I and IV being in parallel with the outside edges 5, 8 of the upper and bottom planes I and IV.

Figure 11A:
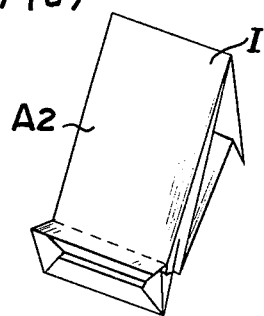
Figure 11B:
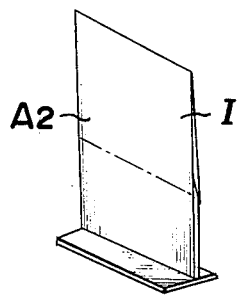
Figure 11C:
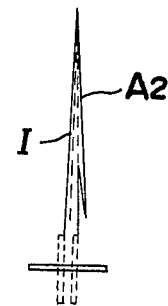
Figure 12:
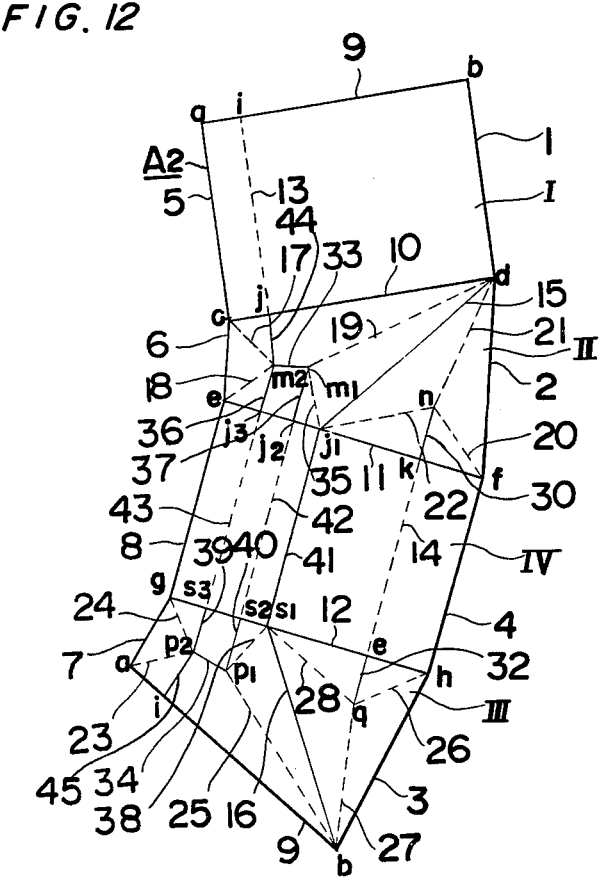
FIG. 12 is a developing view of the bellows of FIG. 10, FIGS. 13 to 15 are perspective views of the camera assembled the components of FIG. 10, showing expanded, partly-folded and completely-folded configurations of the bellows, respectively.
Figure 13:
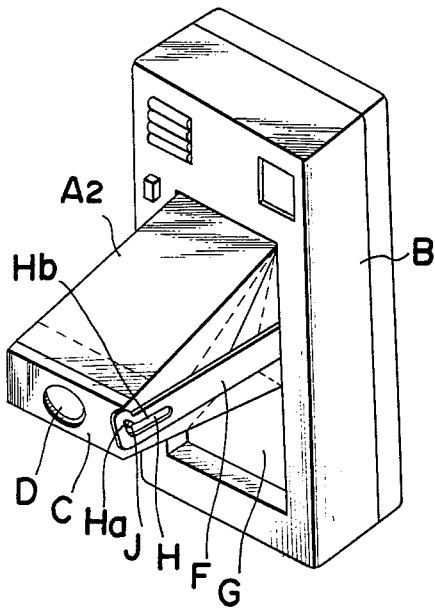
Figure 14:
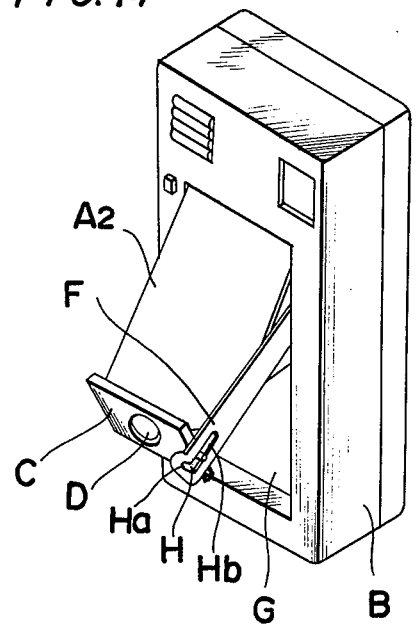
Figure 15:
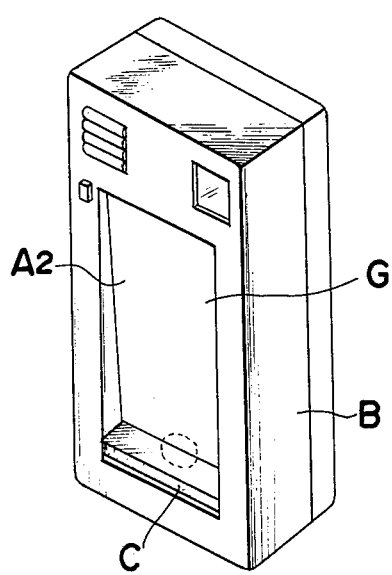

With the construction so far described, all of the folding lines on each plane I to IV are always flattened and the material stretched by extending of the lever F between the lens mount C and exposure frame E of the main body B, as shown in FIG. 13, to form the expanded configuration of the bellows A2 in the same manner as mentioned in the first embodiment. But, upon loosing of the lever F from the pin J of the lens mount C, the bellows A2 are forcibly collapsed, as shown in FIGS. 11 (a) to (c), by folding of the material about all the folding lines 1 to 45 to form a trapezoid sheet with six pleats comprising the diagonal lines 15, 16 and the bottom lines 11, 12 of the side planes II and III divided in five sections 11$kf$, 11$kjl$, 11$jlj2$, 11$j2j3$, 11$ej3$, 12$eh$, 12$es1$, 12$s1s2$, 12$s2s3$, 12$gs3$ by the parallel lines 14, 41 to 43 of the bottom plane IV, and the folded bellows A2 is accommodated within the room G of the main camera body B, as shown in FIGS. 14 and 15, together with the lens mount C which is moved downwardly from the operating position on the axis of the exposure frame E to the nonoperating position lower than the axis of the exposure frame E at a distance of the length of the long section line 10$dj$ of the upper plane I minus the height of the short outside line 6, 7 of the side planes II and III.

Figure 16:
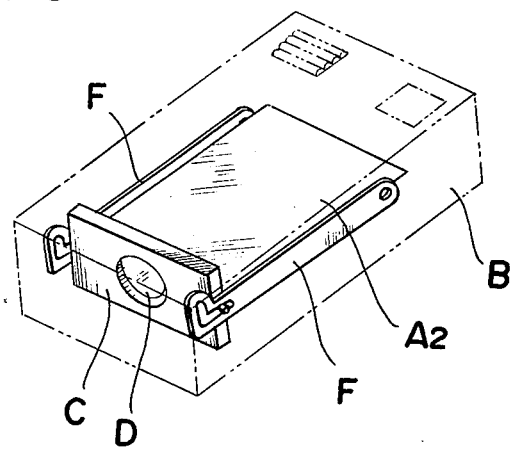
FIGS. 16 and 17 are perspective views of the folded bellows of FIG. 10 associated with the lens mount in vertical and horizontal positions, respectively, FIGS. 18, 19 (a) and 19 (b) are perspective views of a bellows in one modification of the second embodiment, showing expanded, partly-folded and completely-folded configurations thereof.
Figure 17:
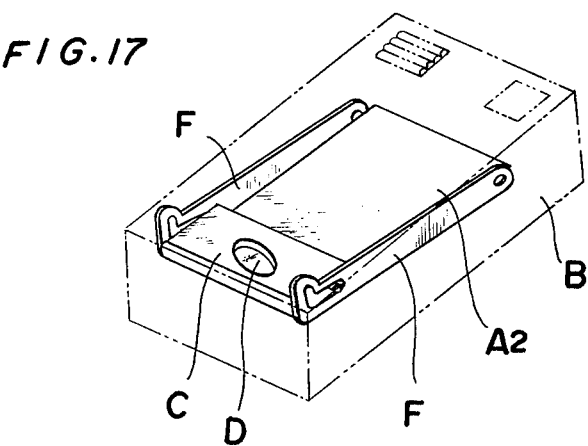
Figure 18:
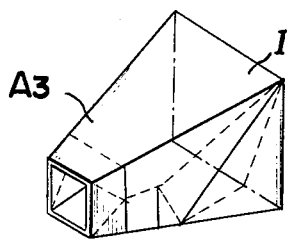
Figure 19A:
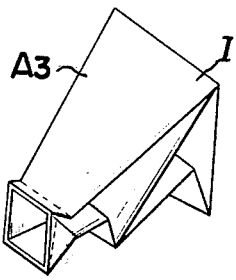
Figure 19B:
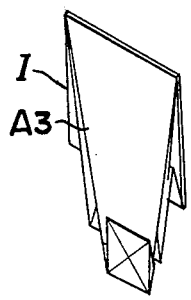
Figure 20:
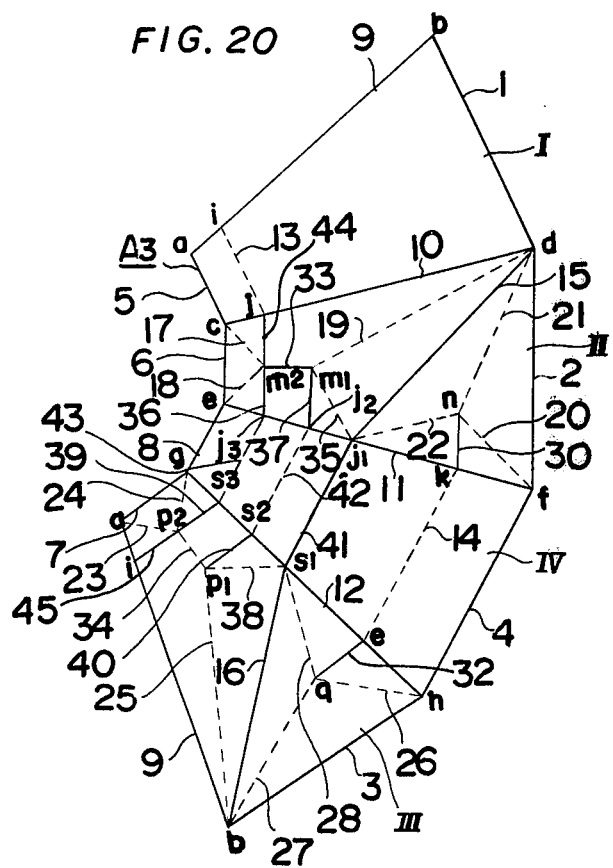
FIG. 20 is a developing view of the bellows of FIG. 18, FIGS. 21 and 22 are perspective views of the folded bellows of FIG. 18 associated with the lens mount in vertical and horizontal positions thereof.

In addition, since there are provided a couple of rectangular lines 13, 43 on the top and bottom planes I and IV in parallel with and in adjacency to the outside edges 5, 8 of the upper and bottom planes I and IV at a distance almost equal to a half of the height of the lens mount C, the lens mount C is easily revolved at any position around the couple of the rectangular lines 13, 43 contacted with each other as formed one line in the folded configuration of the bellows A2, so that the lens mount C can be placed into the room G of the camera main body B arranged either parallel to the axis of the exposure frame E, that is, vertical to the folded bellows A2, as shown in FIG. 16, or vertical to the exposure frame E, that is, parallel to the folded bellows A2, as shown in FIG. 17.

Figure 21:
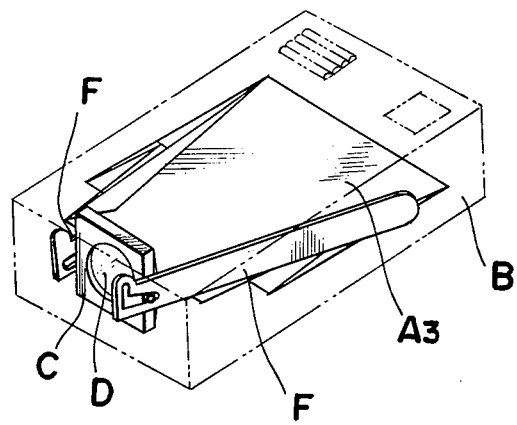
Figure 22:
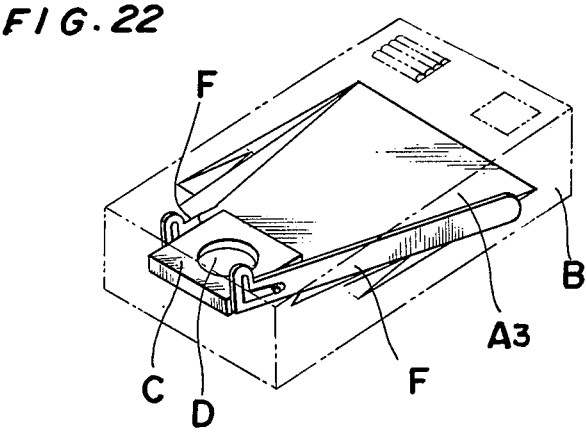

As one modification of the second embodiment, the bellows A3 may be formed, as shown in FIGS. 18 to 22, in the expanded configuration of a frustrum of quadrangular pyramid with the same four trapezoid planes I to IV, each of which is symmetrical with respect to the center right line of the corresponding plane, and openings which are affixed to the lens mount C and exposure frame E. In all of the top, right-side, left-side and bottom planes I to IV there are provided substantially the same folding lines 1 to 45 as provided in the original second embodiment, and the bellows A3 is folded, as shown in FIGS. 21, 22, in the same manner as mentioned in FIGS. 16, 17.

Figure 23:
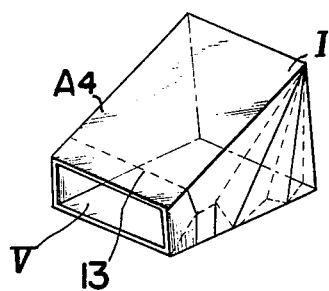
FIG. 23 is a perspective view of a bellows in another modification of the second embodiment.
Figure 24:
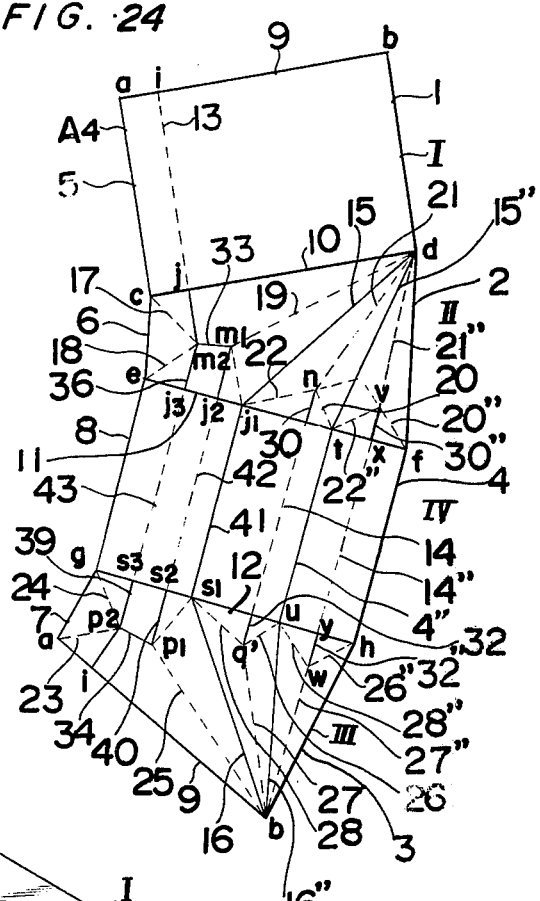
FIG. 24 is a developing view of the bellows of FIG. 23.
Figure 25:
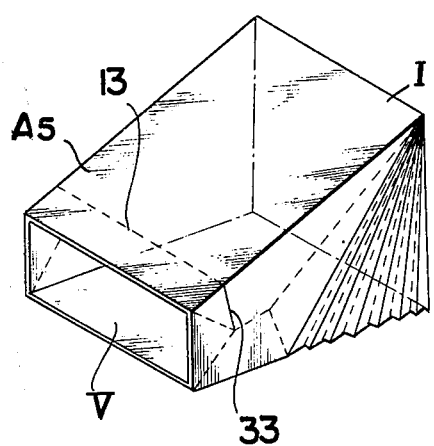
FIG. 25 is a perspective view of the bellows in the other modification of the second embodiment.

In the second embodiment as mentioned above, one end of the diagonal outward folding lines 15, 16 in the side planes II and III intersect with any middle points on the bottom lines 11, 12 of the side planes II and III to elect the proper length of the bottom side of the triangles to facilitate the folding of the bellows A3. Accordingly, if the length of the bottom side of the triangles in the side planes is too long to cause some-trouble in the folding and expanding of the bellows A3, as another modification of the second embodiment, it is possible to provide a plurality a diagonal outward folding lines each connecting the upper-left side corners of the side planes II and III and the corresponding middle points on the bottom lines of the side planes at any interval to form a plurality of triangles within which are provided a set of three bisector inward folding lines bisecting the corresponding vertex angles of the triangles and perpendicular lines connecting between the bottom lines of the side planes II and III and the centroids of the triangles. For example, the bellows A4 showing in FIGS. 23 and 24 provides with a pair of diagonal lines 15, 15'', 16, 16'' on the side planes II and III thereof, associated with the bisector lines 20 to 22, 20'' to 22'', 26 to 28, 26'' to 28'' and perpendicular lines 30, 30'', 32, 32'', 14, 14'', 4'', and the bellows A5 showing in FIG. 25 provides with a lots of diagonal lines on the side planes thereof to facilitate the folding and expanding of the bellows A5.

Although the present invention has been fully described in connection with the preferred embodiments thereof with reference to the accompanying drawings, it should be noted that various changes and modifications are apparent to those skilled in the arts. Therefore, such changes and modifications are, unless they depart from the true scope of the present invention, to be understood as included therein.

What is claimed is:

1. In a foldable camera with a bellows which is made of light proof material taking a shape of a hollow tube of rectangular cross section and of a hexahedral prism in the expanded configuration with top, right-side, left-side and bottom planes and openings at the both ends thereof and being symmetrical with respect to the light axis of the bellows, and being affixed between the exposure frame of a camera body and the lens mount of a lens at said openings, respectively, the improvement wherein the bellows comprises in combination; first outward folding lines provided along all edges of bellows in each of said planes to permit folding of each of said planes toward the exposure frame or lens mount, a second inward folding line provided on the top plane to fold the top plane in two to raise the lens mount against the exposure frame, a third inward folding line provided on the bottom plane parallel with and adjacent to the edge affixed to the exposure frame to fold the bottom plane in two to bow the lens mount against the exposure frame, at least one pair of fourth outward folding lines, each extending diagonally from the upper corner of each of the side planes at the side of the exposure frame to the bottom edge of the same plane and being symmetrical with each other to form at least one triangle, and a set of fifth inward and outward folding lines provided on both the side planes to fold the side planes in association with the folding of said top and bottom planes about said first to fourth lines so as to pile up the bellows material about said first and fourth lines between the exposure frame and lens mount.

2. The bellows for the camera claimed in claim 1, wherein said bellows is formed in expanded configuration with four rectangular planes having openings at the both ends.

3. The bellows for the camera claimed in claim 1, wherein said bellows is formed in expanded configuration of a frustum of a quadrangular pyramid with two rectangular planes and two trapezoid planes which are symmetrical with respect to each center line thereof, and having openings at the both ends.

4. The bellows for the camera claimed in claim 1, wherein said bellows is formed in expanded configuration of a frustum of a quadrangular pyramid with four trapezoid planes which are symmetrical with respect to each center line thereof, and having openings at the both ends.

5. The bellows as defined in claim 1, further comprising sixth folding lines provided on the bottom plane between said first and third lines.

6. The bellows as defined in claim 1, wherein there are provided plural pairs of said fourth lines.

7. In a foldable camera with a bellows which is made of light proof material taking a shape of a hollow tube of rectangular cross section and of a hexahedral prism in the expanded configuration with top, right-side, left-side and bottom planes and openings at the both ends thereof symmetrical with respect to the light axis of the bellows, and being affixed between the exposure frame of a camera body and the lens mount of a lens at said openings, respectively, the improvement wherein said bellows comprises in combination, first outward folding lines provided along all edges of each of said planes to fold each of said planes toward the exposure frame or lens mount, an inward folding line provided on the top plane parallel with and apart from the edge affixed to the lens mount and at a distance from said lens mount affixed edge almost equal to a half of height of the lens mount to fold the top and bottom planes in two to raise and bow the lens mount against the exposure frame, a third inward folding line provided on the bottom plane parallel with an adjacent to the edge affixed to the exposure frame to fold the bottom plane in two to bow the lens mount against the exposure frame, at least one pair of fourth outward folding lines, each extending diagonally from the upper corner of each of the side planes at the side of the exposure frame to a middle point of the bottom edge of the same plane between the first line and the side of the exposure frame and being symmetrical with each other to form at least one triangle, and a set of fifth inward and outward folding lines provided in both the side planes to fold the side planes in association with the folding of said bellows material about said first to fourth lines so as to pile up the bellows material about first and fourth lines between the exposure frame and lens mount.

8. The bellows as defined in claim 7, wherein there are provided plural pairs of said fourth lines.

9. A foldable camera for exposing photographic film comprising a camera main body provided with a frame for exposing a film accommodated therein and a hollow room provided in front of the frame, a lens mount supporting a lens at the center thereof, and a bellows which is made of light proof material taking a shape of a hollow tube of rectangular cross section and of a hexahedral prism in the expanded configuration with top, right side, left side and bottom planes and openings at the both ends thereof symmetrical with respect to the light axis of the bellows, and being affixed between the exposure frame and lens mount at said openings, and being provided with, in combination; first outward folding lines provided along all edges of each of said planes to fold each of said planes towards the exposure frame or lens mount a second inward folding lines provided on the top plane parallel with and adjacent to the edge affixed to the lens mount to fold the top plane in two to raise the lens mount against the exposure frame, a third inward folding line provided on the bottom plane parallel with and adjacent to the edge affixed to the exposure frame to fold the bottom plane in two to bow the lens mount against the exposure frame, a pair of fourth outward folding lines, each extending diagonally from the upper corner of each of the side planes at the side of the exposure frame to the bottom edge of the same plane and being symmetrical with each other to form at least one triangle, and a set of fifth inward and outward folding lines provides on both the side planes to fold the side planes in association with the folding of the bellows material about said first to fourth lines so as to pile up the bellows material about said first and fourth lines between the exposure frame and lens mount, such that said lens mount in the folded configuration of the bellows, is received within the room of the camera main body.

10. A foldable camera as defined in claim 9, further comprising a lever means for maintaining the distance between the lens mount and the exposure frame in the expanded configuration of the bellows, and for permitting the movement of the lens mount in the folding configuration of the bellows.

* * * * *